US009350633B2

(12) United States Patent
Cudak et al.

(10) Patent No.: US 9,350,633 B2
(45) Date of Patent: May 24, 2016

(54) DYNAMIC OPTIMIZATION OF COMMAND ISSUANCE IN A COMPUTING CLUSTER

(75) Inventors: Gary D. Cudak, Creedmoor, NC (US);
Christopher J. Hardee, Raleigh, NC (US); Randall C. Humes, Raleigh, NC (US); Adam Roberts, Moncure, NC (US); Edward S. Suffern, Chapel Hill, NC (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 762 days.

(21) Appl. No.: 13/557,186

(22) Filed: Jul. 24, 2012

(65) Prior Publication Data
US 2014/0032628 A1    Jan. 30, 2014

(51) Int. Cl.
*G06F 15/16*    (2006.01)
*H04L 12/26*    (2006.01)
*H04L 12/24*    (2006.01)

(52) U.S. Cl.
CPC ........ *H04L 43/0852* (2013.01); *H04L 41/0823* (2013.01); *H04L 41/0893* (2013.01)

(58) Field of Classification Search
CPC ............ G06F 11/1687; G06F 11/2025; G06F 17/30194; G06F 11/2023; G06F 11/2069; H04L 41/0654
USPC ......................................................... 709/201
See application file for complete search history.

(56) References Cited

U.S. PATENT DOCUMENTS

| | | | | |
|---|---|---|---|---|
| 6,055,568 | A * | 4/2000 | Adams ......................... | 709/221 |
| 6,937,569 | B1 * | 8/2005 | Sarkar et al. .................. | 370/238 |
| 7,058,706 | B1 * | 6/2006 | Iyer et al. ...................... | 709/223 |
| 2002/0009095 | A1 | 1/2002 | Van Doren | |
| 2002/0091574 | A1 * | 7/2002 | Lefebvre et al. ................ | 705/19 |
| 2007/0274227 | A1 * | 11/2007 | Rauscher et al. ............. | 370/252 |
| 2010/0011126 | A1 * | 1/2010 | Hsu et al. ...................... | 709/249 |
| 2010/0228824 | A1 * | 9/2010 | Lin et al. ....................... | 709/204 |
| 2011/0002333 | A1 * | 1/2011 | Karuppiah et al. ........... | 370/390 |
| 2012/0158996 | A1 * | 6/2012 | Thaler, III .................... | 709/241 |
| 2012/0240176 | A1 * | 9/2012 | Ma et al. ....................... | 725/114 |

FOREIGN PATENT DOCUMENTS

WO    WO 02071760 A2 *    9/2002 .............. H04L 29/06

\* cited by examiner

*Primary Examiner* — Douglas Blair
*Assistant Examiner* — Imran Moorad
(74) *Attorney, Agent, or Firm* — Steven M. Greenberg, Esq.; CRGO Law

(57) ABSTRACT

Embodiments of the present invention provide a method, system and computer program product for dynamic optimization of command sequencing in a computing cluster. In an embodiment of the invention, a method for dynamic optimization of command sequencing in a computing cluster can include selecting a set of nodes in the computing cluster to receive a single command and probing the nodes of the set to compute a computer communications latency for each of the nodes. Thereafter, the single command can be transmitted to the nodes in the set according to a sequence determined by the computed computer communications latency for each of the nodes.

21 Claims, 2 Drawing Sheets

DYNAMIC OPTIMIZATION OF COMMAND ISSUANCE IN A COMPUTING CLUSTER

BACKGROUND OF THE INVENTION

1. Field of the Invention

The present invention relates to cluster based computing and more particularly to command propagation in a computing cluster.

2. Description of the Related Art

Computing clusters have become common in the field of high-availability and high-performance computing. Cluster-based systems exhibit three important and fundamental characteristics or properties: reliability, availability and serviceability. Each of these features is of paramount importance when designing the software and the hardware of a new robust clustered system. As opposed to the symmetric multi-processing (SMP) systems whose scalability can be limited and which can result in substantially diminished returns upon the addition of processors to the system, a clustered-based system consists of multiple computers that are connected over high-speed network communicative linkages.

Each computer in a cluster enjoys its own memory, possibly its own disk space and it hosts its own local operating system. Each node within the cluster system can be viewed as a processor-memory module that cooperates with other nodes such that it can provide system resources and services to user applications. Nodes in a cluster system, however, are not limited to a physical computing system. Rather, nodes in a cluster system also can include virtual machines operating in a physical host environment.

Clusters can be characterized by increased availability since the failure of a particular node does not affect the operation of the remaining nodes. Rather, any one failed node can be isolated and no longer utilized by the cluster-based system until the node can be repaired and incorporated again within the cluster. Additionally, the load of a failed node within a cluster can be equitably shared among the functional nodes of the cluster. Thus, clusters have proven to be a sensible architecture for deploying applications in the distributed environment and clusters are now the platform of choice in scalable, high-performance computing.

Individual computing nodes of a cluster can be managed at the command line or programmatically. Generally, commands are issued from a command source within a process execution space and can be directed to one or more targeted nodes. Typical commands include node reboot, update, launch and shut down to name a few possible commands. In some instances, the same command can be directed to multiple different nodes within a cluster.

When the same command is directed to multiple different nodes within a cluster, the sequence in which the commands are individually transmitted is arbitrary. However, depending upon network conditions, those commands may be received in each of the targeted nodes at different times. In the case of high network latency for some of those nodes, the gap in time of receipt of a command from a node receiving the command soonest and the node receiving the command latest can be intolerable and can result in an unwanted system condition.

BRIEF SUMMARY OF THE INVENTION

Embodiments of the present invention address deficiencies of the art in respect to command and control in a computing cluster and provide a novel and non-obvious method, system and computer program product for dynamic optimization of command sequencing in a computing cluster. In an embodiment of the invention, a method for dynamic optimization of command sequencing in a computing cluster can include selecting a set of nodes in the computing cluster to receive a single command and probing the nodes of the set to compute a computer communications latency for each of the nodes. Thereafter, the single command can be transmitted to the nodes in the set according to a sequence determined by the computed computer communications latency for each of the nodes.

In one aspect of the embodiment, the nodes are probed using a ping directive to each of the nodes. In this instance, the computed computer communications latency accounts for a time consumed in sending data to the nodes using the ping directive. In another aspect of the embodiment, the nodes are probed using a traceroute directive to each of the nodes. In this instance, the computed computer communications latency accounts for a number of hops necessary to reach each of the nodes using the traceroute directive. In yet another aspect of the embodiment, the nodes are probed with a test directive and the computed computer communications latency accounts for a period of time consumed by the nodes to each complete performance of the test directive. In even yet another aspect of the embodiment, the sequence is managed within a data structure of nodes sorted according to the computed computer communications latency for each of the nodes.

In another embodiment of the invention, a clustered computing system can be configured for dynamic optimization of command sequencing. The system can include one or more different computers, each including memory and at least one processor. Each of the computers further can be coupled to the other over a computer communications network. The system also can include multiple different nodes each supported by one or more of the computers and forming a computing cluster. Finally, the system can include a command sequencer executing in memory of one of the computers in association with an originating one of the nodes. The sequencer can include program code enabled to select a set of the nodes to receive a single command, to probe the nodes of the set to compute a computer communications latency for each of the nodes, and to transmit the single command to the nodes in the set according to a sequence determined by the computed computer communications latency for each of the nodes.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for dynamic optimization of command sequencing in a computing cluster. In accordance with an embodiment of the invention, different nodes in a computing cluster can be probed to determine computer communications latency between each of the different nodes and a common originating node. Thereafter, a single system command can be issued to the different nodes in an order determined based upon the computed computer communications latency. In this regard, in one aspect of the embodiment, the nodes with the highest determined latency can be targeted with the system command before those nodes of smallest determined latency. In this way, the gap in time of receipt of the command from a node receiving the command soonest and the node receiving the command latest can be optimized.

Figure 1:
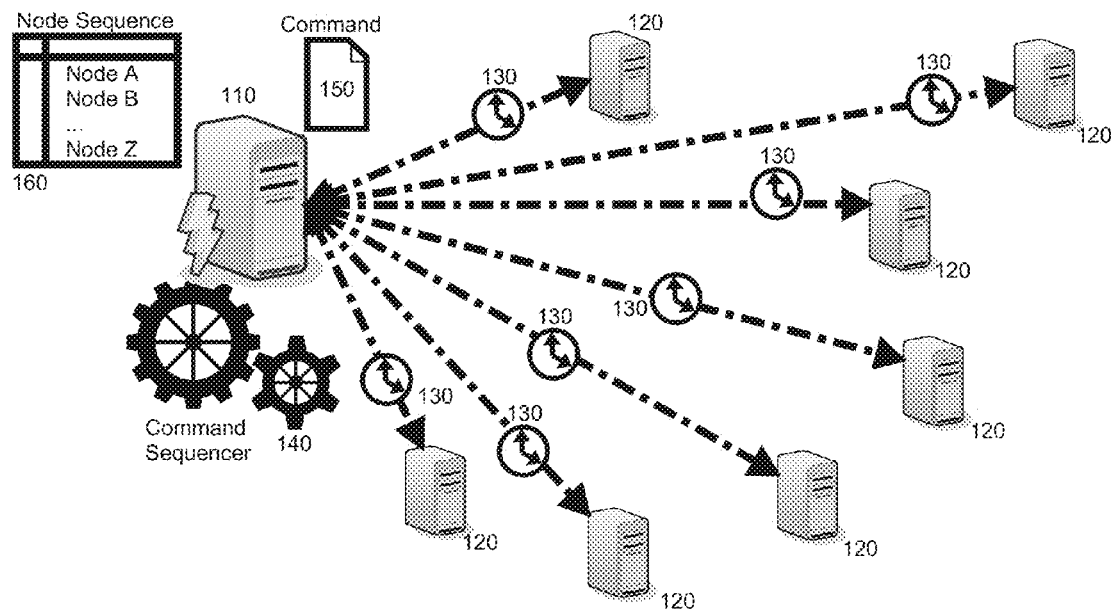
FIG. 1 is a pictorial illustration of a process for dynamic optimization of command sequencing in a computing cluster.

In further illustration, FIG. 1 pictorially shows a process for dynamic optimization of command sequencing in a computing cluster. As shown in FIG. 1, a command sequencer 140 in an originating node 110 of a computing cluster of nodes 120 can probe a selected set of the nodes 120 for computer communications latency 130. For example, the computer communications latency 130 can be computed in terms of an amount of time taken to respond to a request, the time consumed during a "ping" directive, a number of hops consumed in processing a "traceroute" directive, a period of time that lapses before a node begins to respond to a request from the originating node 110, a period of time consumed by each of the nodes 120 to complete performance of a command, and so forth. Using the computed computer communications latency 130, the command sequencer 130 than can create an ordering of the nodes in the form of a node sequence 160 to which a single command 150 is issued to the set of nodes 120 so as to optimize a gap in time in receipt of the command 150 from those of the nodes 120 receiving the command 150 first and those of the nodes 120 receiving the commands 150 last.

Figure 2:
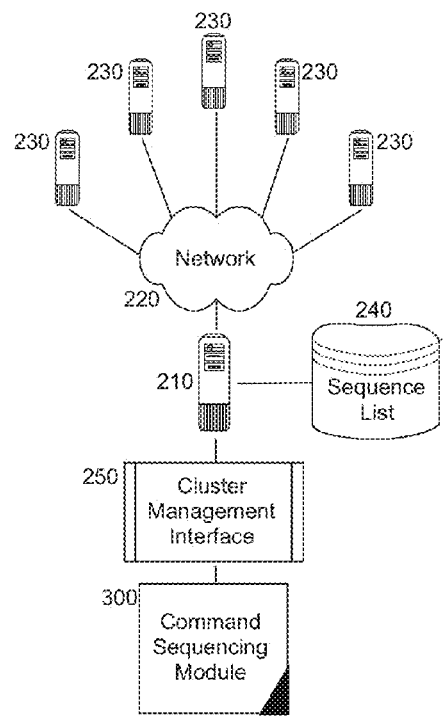
FIG. 2 is a schematic illustration of a clustered computing system configured for dynamic optimization of command sequencing; and, FIG. 3 is a flow chart illustrating a process for dynamic optimization of command sequencing in a computing cluster.

The process described in connection with FIG. 1 can be implemented within a clustered computing environment. In yet further illustration, FIG. 2 schematically shows a clustered computing system configured for dynamic optimization of command sequencing. The system can include a computing cluster 210, 220, 230 that includes multiple different processing nodes 230 coupled to one another over a computer communications network 220. In the simplest form, a single computer with memory and at least one processor can support a single one of the nodes 230. In a more complex implementation, multiple different computers each with memory and at least one processor can support a single one of the nodes 230. In another more complex implementation, a single or multiple different computers can support multiple different ones of the nodes 230, each executing in its own process address space. Optionally, in the latter scenario, each individual one of the nodes 230 can be supported by a corresponding processor of a computer, even when the processor is grouped with a number of different processors in a single computer.

An originating node 210 can be coupled to the other nodes 230 over the computer communications network 220 and can include a cluster management interface 250. The cluster management interface 250 can provide a user interface through which an end user can configure the computing cluster 210, 220, 230 and through which the end user can issue commands to different ones of the nodes 230. Of note, a command sequencing module 300 can be coupled to the cluster management interface 250. The module 300 can include program code that when executing in memory of a computer can probe the nodes 230 to compute for each of the nodes 230 a computer communications latency between the originating node 210 and respective ones of the nodes 230.

Thereafter, a sequence of nodes can be stored in a data store 240 coupled to the originating node 210. The sequencing of nodes can order the nodes according to computed computer communications latency. Consequently, the program code of the command sequencing module 300 can transmit to each of the nodes 230 in the sequence list of the data store 240 a single command in an order dictated by the sequence list. As a result, the gap in time of receipt of the command from one of the nodes 230 receiving the command soonest and one of the nodes 230 receiving the command latest can be optimized.

Figure 3:
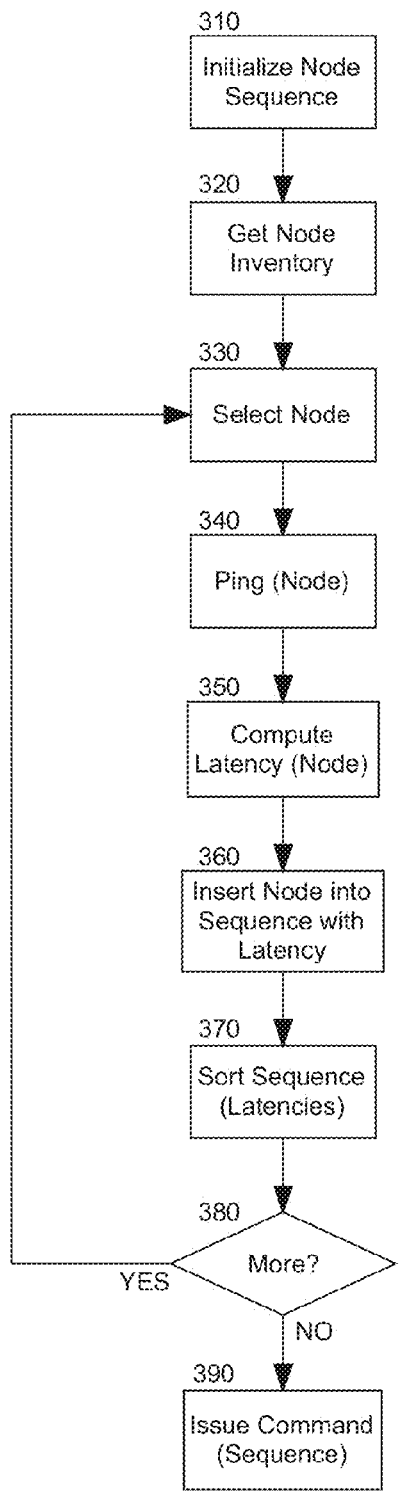

In even yet further illustration of the operation of the command sequencing module 300, FIG. 3 is a flow chart illustrating a process for dynamic optimization of command sequencing in a computing cluster. Beginning in block 310, a node sequence data structure can be initialized to store different entries, each indicating an identity of a node and a computed computer communications network latency. In block 320, an inventory of nodes to be probed can be retrieved from a static list of nodes intended to receive a single command of interest, or the inventory can be determined dynamically through network inspection. In block 330, a first node can be selected for processing.

Once a node has been selected for processing, in block 340 a test directive can be issued in respect to the selected node. The test directive can include, by way of example, a ping directive or a traceroute directive. Based upon the result of the test directive, in block 350 a computer communications network latency can be computed, for instance a time consumed to complete an acknowledged packet transmission in the case of a ping directive, or a number of hops to reach the node in the case of a traceroute directive. Alternatively, the computer communications network latency can be computed as a period of time consumed by the node to complete performance of the test command.

Thereafter, in block 360, an entry for the node can be inserted into the node sequence data structure and the node sequence data structure can be sorted according to the computed computer communications latency for the node in block 370. In decision block 380, if additional nodes in the inventory remain to be processed, the process can repeat through block 330 with the selection of a next node in the inventory. Otherwise, in block 390, a single command can be transmitted to each node in the node sequence data structure in an order specified by the ordering of nodes in the node sequence data structure.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radiofrequency, and the like, or any suitable combination of the foregoing. Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. In this regard, the flowchart and block diagrams in the Figures illustrate the architecture, functionality, and operation of possible implementations of systems, methods and computer program products according to various embodiments of the present invention. For instance, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It also will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

We claim:

1. A method for dynamic optimization of command sequencing in a computing cluster, the method comprising:

selecting a set of a multiplicity of nodes in the computing cluster to receive a single command;

probing the nodes of the set to compute a computer communications latency for each of the nodes;

generating a sequence of the multiplicity of nodes in the set in which the single command is to be transmitted to each of the multiplicity of the nodes in the set based upon the computed latency for each of the multiplicity of the nodes; and, transmitting the single command to the multiplicity of the nodes in the set according to the determined sequence.

2. The method of claim 1, wherein the nodes are probed using a ping directive to each of the nodes.

3. The method of claim 2, wherein the computed computer communications latency accounts for a time consumed in sending data to the nodes using the ping directive.

4. The method of claim 1, wherein the nodes are probed using a traceroute directive to each of the nodes.

5. The method of claim 4, wherein the computed computer communications latency accounts for a number of hops necessary to reach each of the nodes using the traceroute directive.

6. The method of claim 1, wherein the nodes are probed with a test directive and the computed computer communications latency accounts for a period of time consumed by the nodes to each complete performance of the test directive.

7. The method of claim 1, wherein the sequence is managed within a data structure of nodes sorted according to the computed computer communications latency for each of the nodes.

8. A clustered computing system configured for dynamic optimization of command sequencing, the system comprising:

a plurality of computers, each comprising memory and at least one processor, each coupled to the other over a computer communications network;

multiple different nodes each supported by one or more of the computers and forming a computing cluster; and, a command sequencer executing in memory of one of the computers in association with an originating one of the nodes, the sequencer comprising program code enabled to select a set of the multiplicity of the nodes to receive a single command, to probe the nodes of the set to compute a computer communications latency for each of the nodes, to generate a sequence of the multiplicity of nodes in the set in which the single command is to be transmitted to each of the multiplicity of the nodes in the set based upon the computed latency for each of the nodes, and to transmit the single command to the multiplicity of the nodes in the set according to the determined sequence.

9. The system of claim 8, wherein the nodes are probed using a ping directive to each of the nodes.

10. The system of claim 9, wherein the computed computer communications latency accounts for a time consumed in sending data to the nodes using the ping directive.

11. The system of claim 8, wherein the nodes are probed using a traceroute directive to each of the nodes.

12. The system of claim 11, wherein the computed computer communications latency accounts for a number of hops necessary to reach each of the nodes using the traceroute directive.

13. The system of claim 8, wherein the nodes are probed with a test directive and the computed computer communications latency accounts for a period of time consumed by the nodes to each complete performance of the test directive.

14. The system of claim 8, wherein the sequence is managed within a data structure of nodes sorted according to the computed computer communications latency for each of the nodes.

15. A computer program product for dynamic optimization of command sequencing in a computing cluster, the computer program product comprising:

a non-transitory computer readable storage medium comprising a memory device having computer readable program code embodied therewith, the computer readable program code comprising:

computer readable program code for selecting a set of a multiplicity of nodes in the computing cluster to receive a single command;

computer readable program code for probing the nodes of the set to compute a computer communications latency for each of the nodes;

computer readable program code for generating a sequence of the multiplicity of nodes in the set in which the single command is to be transmitted to each of the multiplicity of the nodes in the set based upon the computed latency for each of the multiplicity of the nodes; and, computer readable program code for transmitting the single command to the multiplicity of the nodes in the set according to the determined sequence.

16. The computer program product of claim 15, wherein the nodes are probed using a ping directive to each of the nodes.

17. The computer program product of claim 16, wherein the computed computer communications latency accounts for a time consumed in sending data to the nodes using the ping directive.

18. The computer program product of claim 15, wherein the nodes are probed using a traceroute directive to each of the nodes.

19. The computer program product of claim 18, wherein the computed computer communications latency accounts for a number of hops necessary to reach each of the nodes using the traceroute directive.

20. The computer program product of claim 15, wherein the nodes are probed with a test directive and the computed computer communications latency accounts for a period of time consumed by the nodes to each complete performance of the test directive.

21. The computer program product of claim 15, wherein the sequence is managed within a data structure of nodes sorted according to the computed computer communications latency for each of the nodes.

* * * * *